(12) United States Patent
Lim et al.

(10) Patent No.: US 7,092,590 B2
(45) Date of Patent: Aug. 15, 2006

(54) METHODS OF ALTERING THE RESONANCE OF WAVEGUIDE MICRO-RESONATORS

(75) Inventors: Desmond R. Lim, Cambridge, MA (US); Lionel C. Kimerling, Concord, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/961,572

(22) Filed: Sep. 21, 2001

(65) Prior Publication Data

US 2002/0090163 A1    Jul. 11, 2002

Related U.S. Application Data

(60) Provisional application No. 60/235,007, filed on Sep. 25, 2000, provisional application No. 60/234,844, filed on Sep. 22, 2000.

(51) Int. Cl.
*G02B 6/26* (2006.01)

(52) U.S. Cl. .......................... 385/15; 385/30
(58) Field of Classification Search .......... None
See application file for complete search history.

(56) References Cited

U.S. PATENT DOCUMENTS

| | | | |
|---|---|---|---|
| 4,348,075 A * | 9/1982 | Gottlieb et al. | ............. 385/7 |
| 4,695,121 A | 9/1987 | Mahapatra et al. | |
| 4,729,622 A | 3/1988 | Pavlath | |
| 4,755,021 A | 7/1988 | Dyott | |
| 4,829,532 A | 5/1989 | Kane | |
| 4,900,112 A | 2/1990 | Kawachi et al. | |
| 4,993,035 A | 2/1991 | Laikhtman | |
| 5,341,444 A | 8/1994 | Henry et al. | |
| 5,926,496 A | 7/1999 | Ho et al. | |
| 6,052,495 A | 4/2000 | Little et al. | |
| 6,069,729 A | 5/2000 | Gill et al. | |
| 6,101,300 A | 8/2000 | Fan et al. | |
| 6,243,517 B1 | 6/2001 | Deacon | |
| 6,324,204 B1 | 11/2001 | Deacon | |
| 6,411,752 B1 * | 6/2002 | Little et al. | ............. 385/17 |
| 2002/0186920 A1 * | 12/2002 | Viens et al. | ............. 385/27 |

FOREIGN PATENT DOCUMENTS

EP       0 445 763 A2    9/1991
WO      WO 00/50938      8/2000

OTHER PUBLICATIONS

"Vertically Coupled Glass Microring Resonator Channel Dropping Filters," Little et al. *IEEE Photonics Technology Letters.* Feb. 2, 1999. vol. 11, No. 2, pp. 215-217.

(Continued)

*Primary Examiner*—Euncha P. Cherry
(74) *Attorney, Agent, or Firm*—Gauthier & Connors

(57) ABSTRACT

Methods of tuning, switching or modulating, or, in general, changing the resonance of waveguide micro-resonators. Changes in the resonance can be brought about, permanently or temporarily, by changing the size of the micro-resonator with precision, by changing the local physical structure of the device or by changing the effective and group indices of refraction of the mode in the micro-resonator. Further changing the asymmetry of the index profile around a waveguide can alter the birefringence of the waveguide and allows one to control the polarization in the waveguide. This change in index profile may be used to change the polarization dependence or birefringence of the resonators.

14 Claims, 8 Drawing Sheets

OTHER PUBLICATIONS

"Theory of Loss and Gain Trimming of Resonator-Type Filters," Little et al. *IEEE Photonics Technology Letters*. Jun. 6, 2000. vol. 12, No. 6, pp. 636-638.

Foresi et al. "Photonic-bandgap microcavities in optical waveguides" *Nature*; Nov. 13, 1997; vol. 390, pp. 143-145.

Rafizadeh et al. "Waveguide-coupled AiGaAs/GaAs microcavity ring and disk resonators with high finesse and 21.6-nm free spectral range" *Optical Society of America*; Aug. 15, 1997; vol. 22, No. 16, Optics Letters, pp. 1244-1246.

* cited by examiner

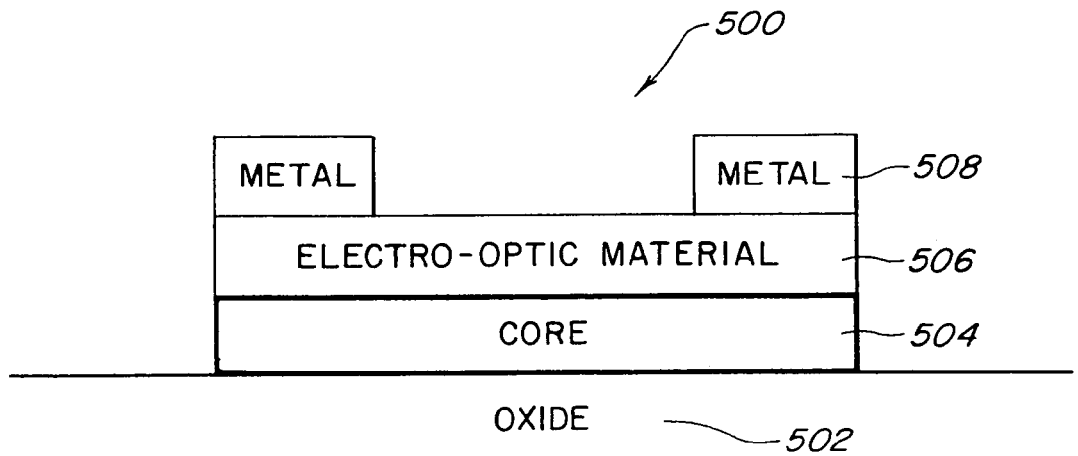
FIG. 5
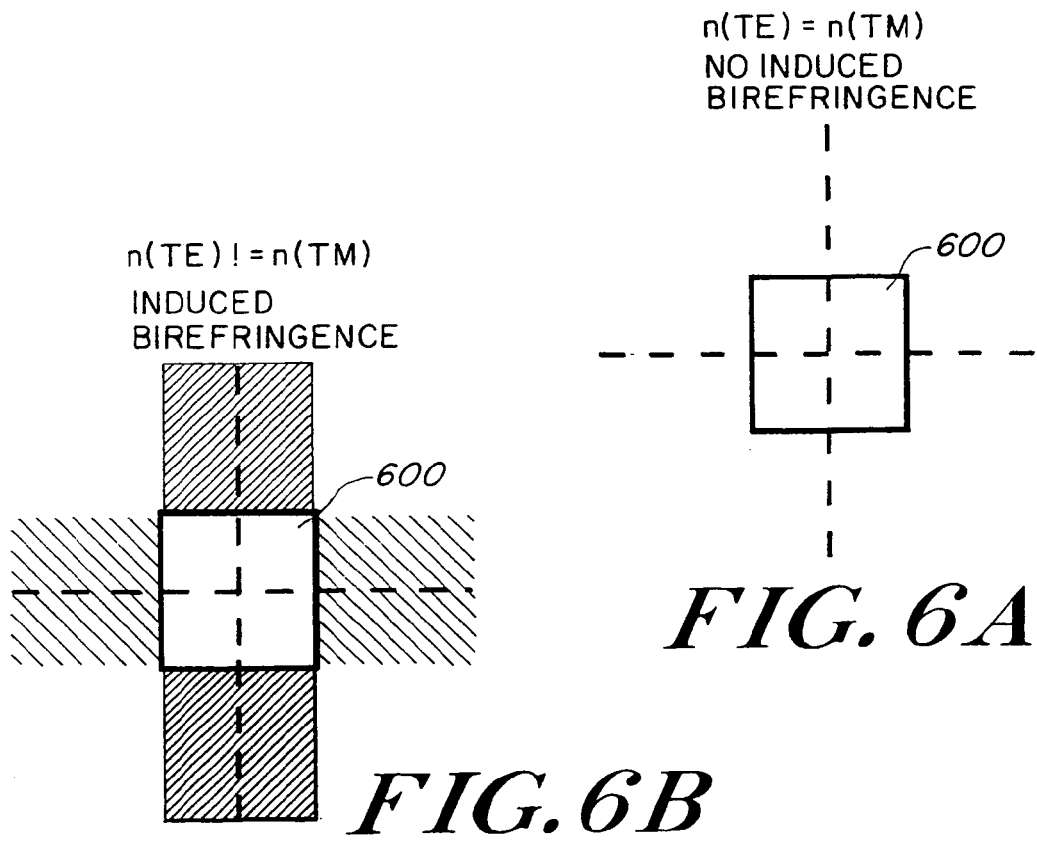
FIG. 6A
FIG. 6B n(TE) n(TM)
INTRINSIC
BIREFRINGENCE
DUE TO FABRICATION
ERROR n(TE) = n(TM)
INTRINSIC
BIREFRINGENCE
COMPENSATED

METHODS OF ALTERING THE RESONANCE OF WAVEGUIDE MICRO-RESONATORS

PRIORITY INFORMATION

This application claims priority from provisional applications Ser. Nos. 60/234,844 filed Sep. 22, 2000 and 60/235,007 filed Sep. 25, 2000.

BACKGROUND OF THE INVENTION

1. Field of the Invention

The present invention is in the field of optics, specifically in changing the characteristics of the resonance of optical waveguide micro-resonators, very small optical micro-resonators with sizes on the order of 0.1 micrometer to 1 millimeter. Examples of such waveguide-based micro-resonators include, optical micro-ring resonators, and one-dimensionally periodic photonic band gap waveguide structures.

2. Prior Art

Micro-resonators, which are micrometer-sized optical resonant devices with resonance wavelengths in micrometer range, have gained significant interests due to its potential applications in integrated optics for optical telecommunication. Micro-resonators are useful as add-drop filters in wavelength division multiplexing (WDM) applications in optical telecommunication, since they can be designed to have resonance at the telecommunication wavelengths. In WDM applications, each micro-resonator adds or drops distinctive wavelengths of light that are resonant with the device. In such applications, an ability to locally tune the resonance of micro-resonators according to the specific wavelengths is crucial for successful implementation of micro-resonators in integrated optics.

Small micro-resonators, formed from high index difference (difference in the refractive indices of core and cladding) waveguide geometries are particularly useful since their free spectral ranges are large. High index difference waveguides, typically have index difference between the core and cladding equal to or larger than 0.3 and can be made in several different geometries, including channel waveguides and rib waveguides. A channel waveguide is a dielectric waveguide whose core is surrounded by a cladding that is composed of a material or materials with refractive indices lower than that of the core, and wherein the peak optical intensity resides in the core. High index difference waveguides can be defined in other waveguide geometries including a rib waveguide. A rib waveguide is a dielectric waveguide whose core is surrounded by a cladding that is composed of materials of which at least one has the same refractive index as that of the core. In waveguide configurations that are difference from a channel waveguide, a high index difference waveguide is defined as one that has a mode-field size similar to that of a high index difference channel waveguide (within 50% difference in cross-sectional area). In these waveguides, cladding is defined as a region where the evanescent field of optical modes exists.

Changing the characteristics of the resonance shape and position of a waveguide micro-resonator is an extremely important issue since the usefulness of such devices is predicated on such technology. One application of the waveguide micro-resonator is narrow band optical filtering in integrated optics. Wavelength division multiplexing (WDM), an increasingly used technology in optical communications, requires the use of such filters. Therefore, developing an efficient method of modifying the characteristics of such waveguide micro-resonators has been the subject of much research.

There are two approaches to changing the characteristics of the resonance shape. The first is to understand what characteristics of the response may be changed. For example, the resonance Q, or its quality, its position in the wavelength or frequency domain and its shape may all be changed.

The quality or the Q of the resonance can be changed by affecting the amount of time the energy stays in the resonator. One method shown to affect the quality of the resonance includes inducing absorption in a micro-resonator and a method to affect the shape by using cascaded micro-resonators. This first method is difficult to implement, since the amount of absorption that has to be induced is large and the method cannot be easily applied to indirect-band-gap semiconductors and wide band gap dielectric materials. The second method, while useful, does not lend itself well to any dynamic changes in the resonance, which is necessary for switching or modulating or even tuning the resonance of the micro-resonator.

The resonance position, that is, the resonant wavelength or equivalently the resonant frequency of an optical micro-resonator is determined by the physical dimension of the device as well as the index of refraction of the materials that comprise the cavity. Changing the effective and group indices of the cavity mode can therefore change the resonant wavelength. Tuning of micro-ring micro-resonators by using a UV sensitive glass as a cladding material over the core of a low index contrast (typically a difference in index of core and cladding of less than 0.1) ring waveguide has also been shown. By changing the index of refraction of the cladding the effective and group indices of the mode of the ring waveguide changes, resulting in a shift in the resonance line position. While this method is effective for low index contrast waveguides, the method may be less effective for high index contrast (typically difference in index of core and cladding equal to or greater than 0.3) waveguides as the amount of index change required for high index contrast waveguides may be too large. However, small index changes in the cladding of high index contrast waveguides can lead to significant shifts in the line position sufficient for fine tuning applications.

Methods have also been shown to change the resonances of semiconductor micro-resonators by changing the refractive index of the core (guiding layer) of the micro-resonator. However, the methods do not include index changes in the cladding region and non-semiconducting substrates. Another method involves using the specific case of micro-ring filters with input and output waveguides that cross. Such a micro-ring filter configuration is necessarily a low index difference waveguide system because cross talk and losses are otherwise large in high index contrast systems.

Another method, which has been used extensively, is a thermo-optic tuning method in which the thermo-optic effect is used to change the index of the core of the micro-resonator cavity by a change in temperature. Thermal tuning, while simple and easy to implement has the disadvantage of significant cross talk in potential high density applications.

The second approach of analyzing how a resonance shape may be changed is to understand what physical aspects of the micro-resonator may be easily altered to have the desired effect on the characteristics of the resonance shape. For example, the absorption method and local proximity of multiple rings has been used to change the resonance shape of a micro-ring. Various other methods involve the change of the resonator internal rate of decay to change the resonance shape of micro-resonator devices. The internal rate of decay of resonator is determined by absorption and loss in the ring.

Another way to tune the resonance of a micro-resonator is to apply stress to shift its resonance positions. If the applied stress induces a change in the refractive indices of core and/or cladding materials, the resonance condition changes in the micro-resonators and the resonance peak will shift according to such a change.

Tuning of optical resonance by stress has been achieved previously. A method of tuning the resonance of a large optical resonator using a bonded piezo-electric element has been described. A piezo-electric element is bonded on the top surface of an optical resonator to supply stress to the underlying optical resonator when a voltage is applied to it. The stress applied to the resonator induces a change in the refractive index and thus changes the resonance. This method is applicable only for large, discreet optical element, and is not suitable for locally tuning resonance of micro-resonators, which are significantly smaller and typically integrated on-chip with waveguide input and output. Therefore, it is desired to have an ability to locally tune micro-resonators on-chip.

The thermo-optic effect and the use of the UV sensitive oxide, are examples of changing the resonance position by altering the effective and group indices of the modes in a micro-resonator cavity. In the invention, the focus is on other methods to change the position and shape and resonances of high index contrast waveguide micro-resonators, which are easier to implement.

The mechanisms to change the resonance of micro-cavity resonators are split along three lines in the literature according to the desired speed or equivalently, the time frame of their intended use. The fastest applications are in modulation, which usually occurs at the speed at which data is encoded. In communications, the speed is in excess of 1 GHz, which corresponds to times of less than 1 ns. Switching occurs at the speed at which data needs to be routed between lines in communications network. Slow switching is on the order of a ms, while packet switching may be as fast as 1 ns. Finally, tuning refers to permanent or long-term changes in the resonance.

SUMMARY OF THE INVENTION

In accordance with the invention there are provided methods of tuning, switching or modulating, or, in general, changing the resonance of waveguide micro-resonators. Changes in the resonance can be brought about, permanently or temporarily, by changing the size of the micro-resonator with precision, by changing the local physical structure of the device or by changing the effective and group indices of refraction of the mode in the micro-resonator. Further changing the asymmetry of the index profile around a waveguide can alter the birefringence of the waveguide and allows one to control the polarization in the waveguide. This change in index profile may be used to change the polarization dependence or birefringence of the resonators. The invention is useful for changing the resonance characteristics of high Q (Qequal to or greater than 100) micro-resonators, since it is difficult to fabricate a waveguide micro-resonator that has a high Q resonance, with infinite accuracy.

It is an objective of the invention to provide methods for changing the resonance of an optical micro-resonator cavity. Methods and devices are provided for altering the position of the resonance in the frequency or wavelength domains of an optical micro-resonator cavity, and for altering the shape of the resonance of an optical micro-resonator cavity. It is another objective of the invention to provide a method for controlling the polarization in an integrated optics waveguide, and to provide a method for increasing or eliminating the birefringence of optical waveguide micro-resonators.

The methods to change the resonance of micro-resonator cavity include changing the absorption and thus the internal rate of decay of the micro-resonator cavity, changing the index of refraction of the materials in local proximity to the micro-resonator cavity, changing the physical structure of the micro-resonator cavity, changing the physical structure in the local proximity around the micro-resonator, changing the symmetry of the index profile of the micro-resonator cavity, and changing the material birefringence of the micro-resonator cavity.

In accordance with the invention, the etching or the removal or the adding of a film to an optical micro-resonator cavity changes the position of the resonance. The removal or the etching of the film may be brought about by chemical means which includes directly exposing the cavity to an oxidizing ambient. Further, modifying the local environment of the micro-resonator cavity using a micro-electrical and mechanical or MEMs device changes the shape of the resonance. A MEMs device can be used to bring either an absorbing material or otherwise a non-absorbing material in close proximity or in contact with the micro-resonator device.

Optical illumination with laser light, which can be absorbed by the core, induces a permanent refractive index change in the core or a permanent size change that in turn may be used to change the position of the resonance of the micro-resonator cavity. The use an electro-optical material as the cladding of a micro-resonator cavity, allows the resonance position of the cavity to be controlled.

Changing the index of refraction of the cladding of a high index contrast (difference in index of core and cladding equal to or greater than 0.3) waveguide cavity can be used for changing the position of the resonance. Changing the symmetry of integrated optical waveguide will result in a change in the polarization dependent behavior of the waveguide. This change may be exploited in an integrated optical waveguide polarization controller. Changing the symmetry of the index profile of the micro-resonator cavity can be used to induce or eliminate the cavity's polarization dependent resonance position.

Applying local stress can locally control the refractive index of a micro-resonator. The change in the refractive index in turn will shift the resonance position of the micro-resonator.

BRIEF DESCRIPTION OF THE DRAWINGS

FIG. 5 is a schematic block diagram of a system for changing the index of material cladding to change the resonance of high index contrast waveguides;

FIGS. 6A–6D are schematic block diagrams of how the symmetry of a waveguide may be changed by changing the index profile for either the TE or TM modes;

DETAILED DESCRIPTION OF THE INVENTION

Figure 1A:
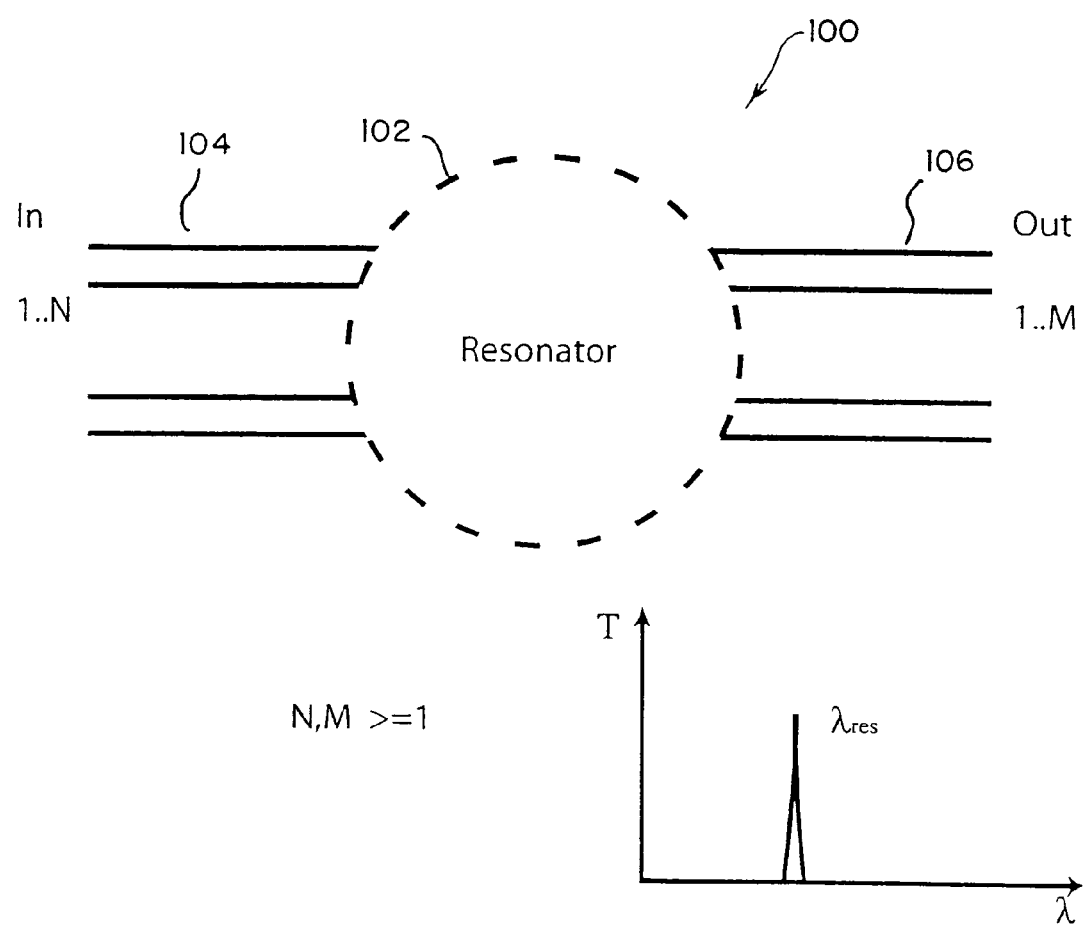
FIG. 1A is a schematic block diagram of an exemplary micro-resonator cavity.

A. Methods for Permanent Change of Resonance Position and Resonance Shape. Devices for Temporary Tuning of Resonators a. Permanent Tuning and Trimming of Optical Waveguide Micro-Resonator Cavities by the Removal or Deposition or Growth a Thin Film FIG. 1A is a schematic block diagram of an exemplary micro-resonator cavity 100. The cavity 100 includes a generic resonator 102 with N input 104 and M output 106 waveguides. The response of at least one of the output waveguides of the micro-resonator cavity close to the resonance is shown in the bottom right inset. For purposes of illustration, the resonance is defined as the sharp spike shown in the inset and the wavelength, $\lambda_{res}$ is the position of the resonance in the wavelength spectrum. The y-axis label is the transmission, T.

Figure 1B:
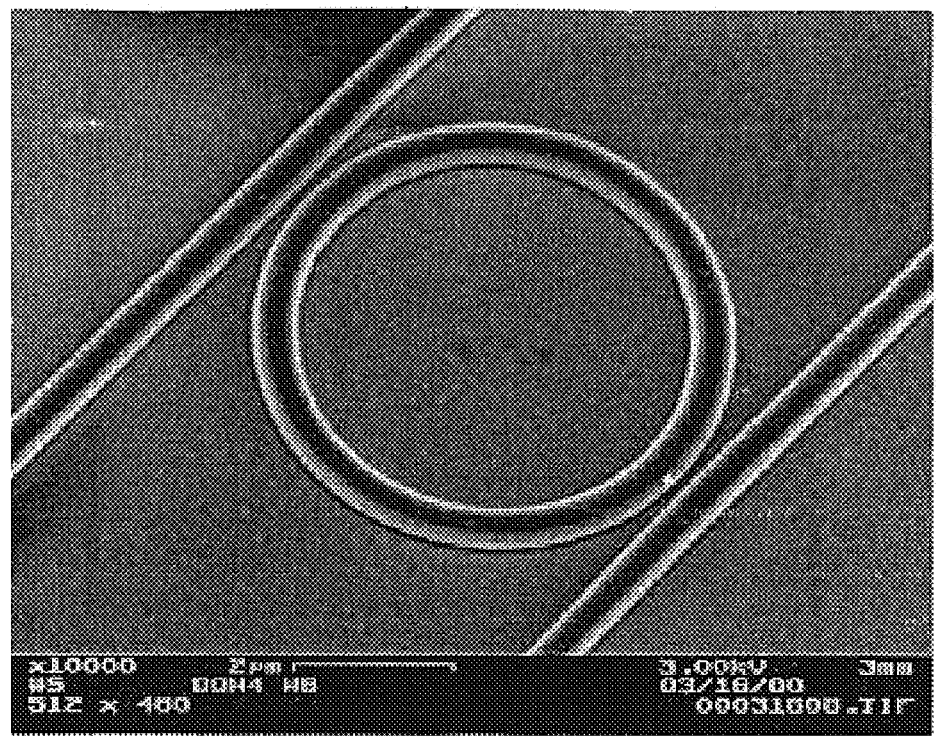
FIG. 1B is a microphotograph of an exemplary waveguide micro-resonator cavity in the form of a micro-ring resonator.

FIG. 1B is a microphotograph of an exemplary waveguide micro-resonator cavity in the form of a micro-ring resonator. The micro-ring resonator has a waveguide that is in a topology of a ring coupled to two straight bus waveguides as shown in the figure. Light enters from one waveguide and a small fraction is then coupled into the ring. After a round trip around the ring, if the wavelength of light is resonant in the ring, the light that is in the ring adds in phase to the light, which is coupling from the bus into the ring. Power then builds up and in steady state; energy in the ring is then coupled into the second bus waveguide. Off resonance the power in the ring waveguide never builds up and the energy in the input bus waveguide travels past the ring almost unscathed.

The invention involves the removal, deposition or growth of material, for example, a thin film in or around the core of one or more micro-resonators. The removal of material from either the core or the cladding of a micro-resonator reduces the effective and group indices of the micro-resonator cavity mode, resulting in a red shift of the resonance. Deposition of material on either the core or the cladding of a micro-resonator results in an increase in the effective and group indices of the micro-resonator cavity mode, resulting in a blue shift of the micro-resonator cavity mode. Growth of a layer is defined herein as the consumption of a thin film of substrate in a chemical reaction for the formation of a thin film of new material. This new material may have a different index from the original material and will in general, cause a change in the effective and group indices of the micro-resonator cavity mode.

Figure 2A:
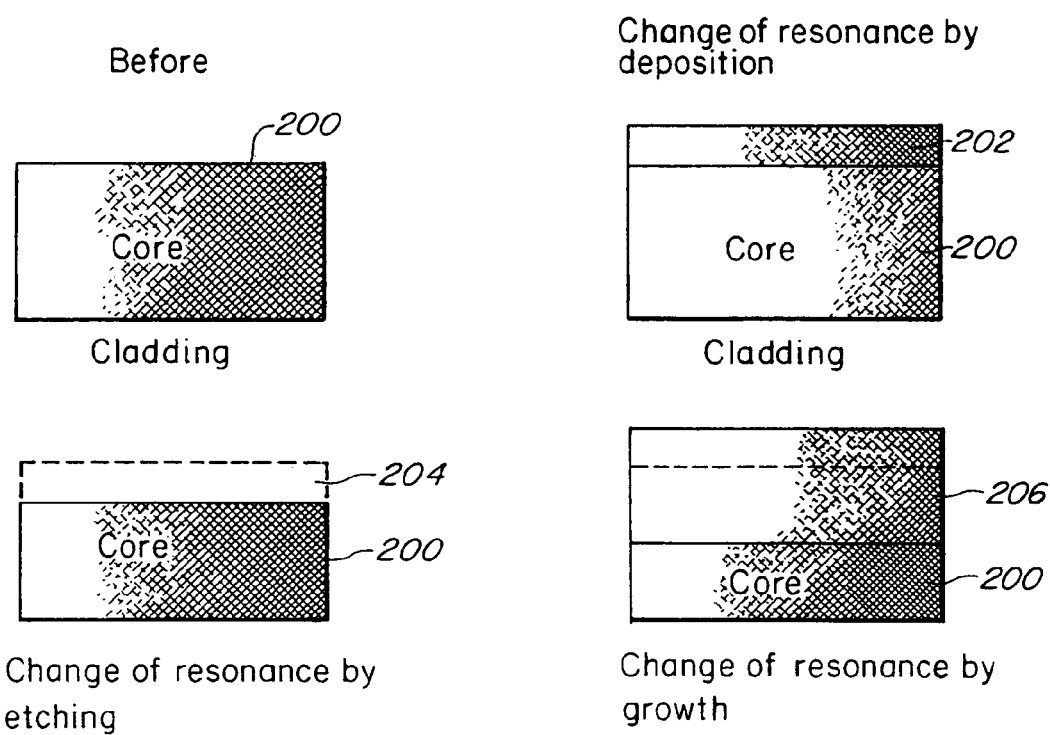
FIG. 2A is a schematic diagram of how removal, deposition or growth of a thin film can be used to tune or trim the resonance of a micro-cavity resonator.

FIG. 2A is a schematic diagram of how removal, deposition or growth of a thin film can be used to tune or trim the resonance of a micro-cavity resonator. The top left hand portion shows an unprocessed waveguide cross section 200. The waveguide is shown schematically as a rectangle, although it can be any shape. In the top right hand portion of the figure, the effect of deposition of a dielectric material 202 on the core is shown. Here the core index is modified by the presence a thin film, which in turn changes the effective and group indices in the waveguide. In the bottom left portion, a portion 204 of the core is removed resulting in a lower effective index, resulting in an apparent red shift of the resonance wavelength. In the bottom right hand portion, the effect of growth of material 206 is portrayed. Here some material is consumed, to form a chemically different material. Depending on the final layer, this usually results in a blue shift of the resonance, although it is possible to design a red shift.

The decay time of one or more micro-resonators may also be changed by the removal, deposition or growth of a thin film in or around the core of the micro-resonators. There are two possible physical effects for this. The first is a change in the coupling coefficient from the micro-resonators to the external bus waveguides. The second physical effect that can cause a change in the decay time of the waveguide micro-resonator is a reduction in the intrinsic loss of the micro-resonator. One example of this is the deposition or growth of a thin film, which has an index or a continuum of indices (grading) between the indices of refraction of the core and the cladding of the micro-resonator.

In all of these methods, the keys to tuning and trimming are tightly controlled deposition, removal and growth processes. For example, a 1% change in the effective length of the micro-resonator cavity can result in a shift of 15 nm in the resonance line position at a wavelength of 1550 nm. Thus, the film thickness has to be finely controlled, since the resonance position typically needs to be within 0.1 nm of the designed center frequency.

Figure 2B:
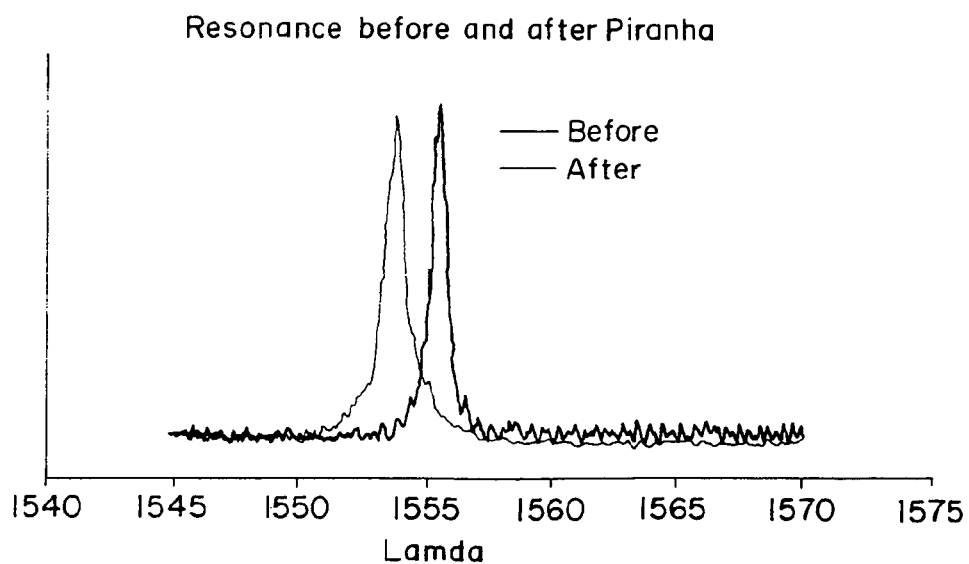
FIG. 2B is a graph with a plot of the resonance shift of a 5-micron radius micro-ring resonator as a result of chemical oxidation.

A very well controlled chemical oxidation process was used to change the position of a resonance of a ring resonator in accordance with the invention. A five-micron radius ring resonator was fabricated using a single mode silicon waveguide. The response of the ring was then measured. A piranha (3:1 $H_2SO_4$:$H_2O_2$) solution was then used to chemically oxidize the surface, and ring response was re-measured. A resonance line position shift of 3 nm was measured. Since the amount of oxidation is dependent on the concentration of the piranha solution as well as the time that the ring is exposed to the solution, this is an effective method of controlling the position of the line of the device. The results of this experiment are shown in the graph of FIG. 2B. The results show clearly a blue shift as would be expected when a high index material (silica, n=3.5) is oxidized to a lower index contrast (silica, n=1.5).

As previously described, the process for removal deposition or growth of the material must be very tightly controlled. One effective method of controlling the film thickness is to use a slow chemical reaction. For example, a chemical oxidation method is used, which grows only 5 nm of silicon oxide in about 10 minutes. Thus, by carefully calibrating the chemical method, a very minute amount of silicon waveguide will be consumed. There are many ideas in the literature on how to control the thickness of a thin film and the following list is by no means exhausted. For the removal of thin films, some form of physical, gas or liquid phase chemical or reactive ion etch may be used.

For the deposition of thin films, a sputtering, spin-on, chemical vapor deposition or molecular beam epitaxy may be used, all of which are described in the literature. Finally for the growth of thin films, some form of plasma, vapor or liquid phase chemical reaction is usually used. The variety of substrates and chemical reactions that may be used precludes an exhaustive listing here.

b. In-Situ and Permanent Optical Tuning and Trimming of for Optical Waveguide Micro-Resonator Cavities Using EM Energy In accordance with the invention, a laser or some other form of electromagnetic wave energy is focused locally on a micro-resonator cavity. If a substantial amount of thermal energy is transferred to the micro-resonator cavity, the material may undergo a physical or mechanical change or an index change in the core or the cladding of the micro-resonator. The second effect can be the result of thermal differential thermal expansion between the core and cladding, followed by plastic deformation of either the core or cladding of the micro-resonator. The first effect can also be induced by a laser induced chemical change. These two methods can change the physical structure of the micro-resonator cavity, which in turn changes the effective path length or the effective and group indices of the micro-resonator cavity mode.

In addition, the electromagnetic energy can result in a change in the external decay time of the micro-resonator. The first is a change in the coupling coefficient from the micro-resonators to the external bus waveguides. The second physical effect that can cause a change in the decay time of the waveguide micro-resonator is a reduction in the intrinsic loss of the micro-resonator. One example of this is the deposition or growth of a thin film, which has an index or a continuum of indices (grading) between the indices of refraction of the core and the cladding of the micro-resonator.

The effect of index change in the core can be a result of a photosensitive material or a long lasting photo-refractive effect. Optical tuning and trimming is particularly useful because the effect can be localized and no significant cross talk would occur.

In accordance with the invention, this technique has been used to change the position of the resonance of a micro-ring resonator. Further, a temporary effect is induced by the use of the photo-refractive effect. A ring resonator was fabricated using a single mode silicon waveguide. Light was focused from a laser onto the micro-ring. After allowing the ring to come to thermal equilibrium, the light was turned off and allowed to relax. The relaxed wavelength was shifted 12 nm from its original position. It has been shown in accordance with the invention that this effect saturates. After many thermal cycles, the resonance of the micro-ring does not change in position.

Figure 4A:
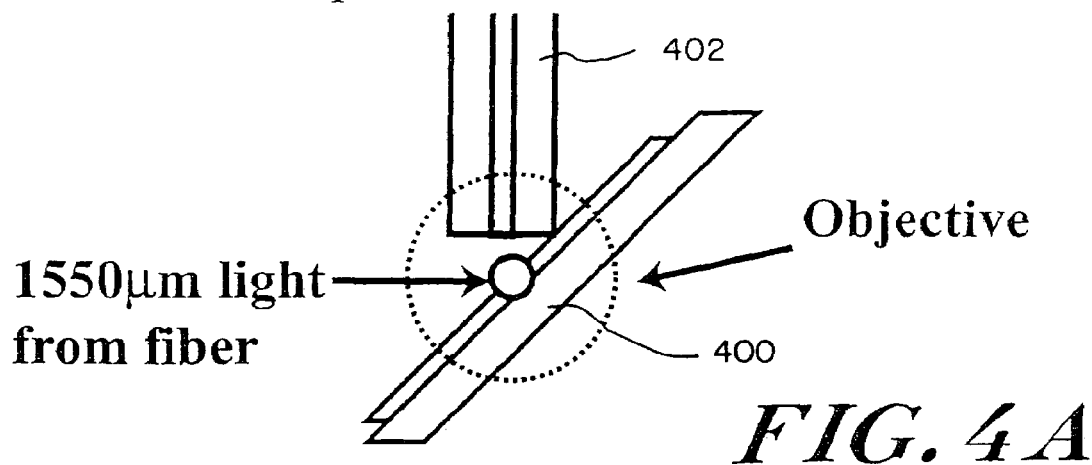
FIG. 4A is a schematic block diagram of optical illumination to change the resonance of a micro-resonator cavity.

FIG. 4A is a schematic block diagram of optical illumination to change the resonance of a micro-resonator cavity 400. The view is a cross-section normal to the direction of propagation. The laser light is provided by 1 W, 850 nm laser via a fiber 402. The light that is filtered by the resonator enters out of the plane of the paper and is collected in the objective. The illumination from the top by the high-powered laser causes the change in the resonant line position. The numerical values indicate the values used to effect these changes and do not preclude the use of any other numerical values.

Figure 4B:
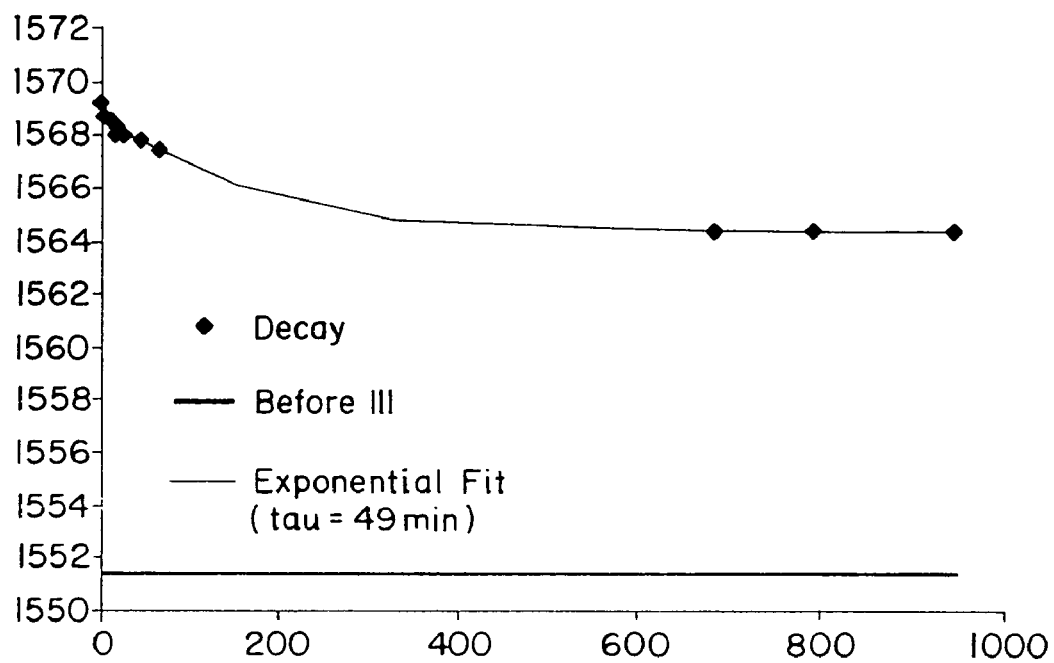
FIG. 4B is a graph with a plot of the post optical illumination resonance position relaxing to a different wavelength.

FIG. 4B is a graph with a plot of the post optical illumination resonance position relaxing to wavelength (1565 nm), which is 13 nm more than the original wavelength. The x-axis is in time and the y-axis is in wavelength. The dotted line represents the original wavelength. Upon illumination, the wavelength jumps to in intermediate value and slowly recovers to a new value. This last relaxed value is 13 nm from the original wavelength prior to illumination.

Figure 4C:
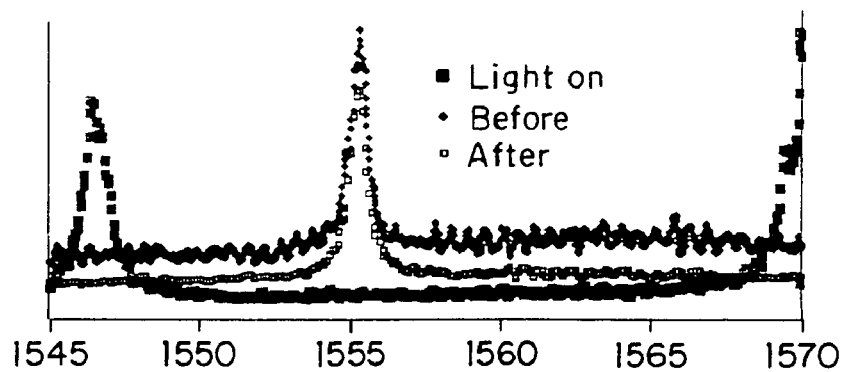
FIG. 4C is a graph with a plot of the resonance peak position before during and after optical illumination.

FIG. 4C is a graph with a plot of the resonance peak position before during and after optical illumination, showing that the effect is self-limiting. Repeated illuminations of the type shown in FIGS. 4A and 4B, results in a saturation effect, which further illumination does not change. The x-axis is in wavelength and the y-axis is normalized transmission.

Taken together, FIGS. 4A–C show how one would use an optical illumination method to change the resonance of a micro-resonator cavity. The exemplary embodiment used a 1 W, 850 nm laser coupled to a fiber to focus a small spot onto a silicon micro-ring resonator. In general, the laser light would be chosen to be transparent to the cladding layers and absorbing to the core layers to deliver the maximum energy to the core. The result is a slowly decaying change in the resonance line position of the order of 100 seconds. However, the final position of the resonance after illumination was 13 nm from the original wavelength. This is an enormous shift. By controlling the intensity and the energy delivered to the micro-resonator, it is possible to control the amount of change in the position of the resonator. Finally, it has now been shown that the resonance change effect is self-limiting and after many repeated illumination cycles, the position of the resonance stops changing.

The micro-resonator cavity that needs to be tuned is first tested. Once the magnitude of the tuning (the amount of shift in the resonance line) is determined, a high intensity laser spot is shone on the ring. There are two ways to determine the dose of the required laser exposure. The first is to use a calibration method to determine the amount of laser dose required to cause a series of line shifts. The second is to measure the laser line shift in situ and to take into account any thermal shifts that might occur.

The laser light may be chosen to be absorbing to the micro-resonator cavity and transparent to the top or bottom cladding layers or alternatively, absorbing in the cladding and transparent to the core. In this way, a large amount of energy would be transferred to either to the core or the cladding, which would in turn lead a large differential effect. In addition, the laser spot size should be on the order of the size of the optical micro-resonator cavity, as this would enable the tuning of a single resonator cavity without affecting any other components on the circuit.

c. Device for Tuning Optical Waveguide Micro-Resonator Cavities

Figure 3A:
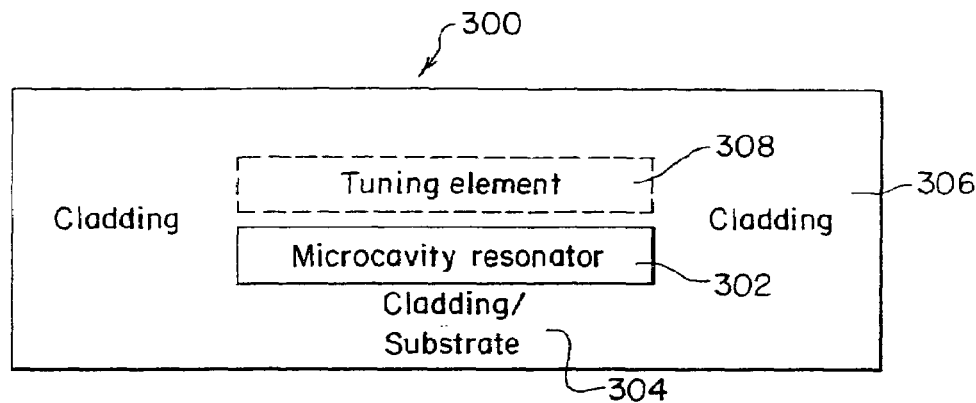
FIG. 3A is a schematic of an optical tuning device such that a resonator is tuned by the presence of a tuning element.

In accordance with the invention, a device for tuning optical waveguide micro-resonators is now described. The device temporarily changes the position or the shape of resonance of a high index difference waveguide micro-resonator. It includes a micro-resonator device with a patterned layer core surrounded by a cladding, such that the micro-resonator has input and output waveguides that do not physically intersect. The cladding includes a region or regions surrounding the core where the evanescent field resides unless the device is temporarily tuned. The temporary tuning effect is brought about by a temporary change in index of refraction in one or more patterned layers (tuning region). The temporary change in the tuning region is brought about by a current or by a change in voltage on at least one electrode not in contact with the core. The tuning region consists of one or more materials, which exhibit the electro-optic, thermo-optic, acousto-optic, magneto-optic photo-refractive effect or which can be actuated by electro-mechanical means. The tuning region may or may not be in contact with the core the micro-resonator. FIG. 3A shows a schematic of such a device.

FIG. 3A is a schematic block diagram of a system 300 in which a tuning element 308 is used to change the resonance of a micro-resonator cavity 302. The resonator and tuning element are configured on a cladding/substrate 304 and surrounded by cladding 306.

In one embodiment of the invention, the modulating and switching of high index contrast (index difference between the core and cladding equal to or greater than 0.3) waveguide micro-resonator cavities by changing the cladding index. One of the difficulties with a high index contrast waveguide is that it is difficult to change the index of the core of the waveguide without metal contacts interfering with the mode of the waveguide. By changing the index of cladding, the problem is alleviated since the electrodes or metal contacts can be placed in the cladding of the resonator.

In another embodiment of the invention, an electro-optic material is used as the cladding material for optical waveguide micro-resonator cavities. By applying a voltage across the electro-optic cladding material, the index of refraction of the cladding is changed. The advantage of using the cladding over the core of the waveguide is closely linked to the fact that most of the power of an optical waveguide is concentrated in or around the core of the waveguide. If the electro-optic effect is used in the core of the waveguide, as proposed in the literature, then the metal electrodes would have to be close to the core of the waveguide micro-resonator, since the core has a higher index of refraction than the cladding. This, in turn, implies that the losses will be high and the Q of the device will be limited. If the metal electrodes are placed far (greater than 1 devay length of the evanescent field) from the core of the waveguide to reduce loss, then a substantial proportion of the field will drop across the low index waveguide, reducing the effectiveness of the device. The invention, therefore allows for the implementation of an electro-optic material in a micro-resonator cavity device without affecting its loss characteristics.

FIG. 5 is a schematic block diagram of a system 500 that effects the changing of the index of material cladding to change the resonance of high index contrast waveguides. The waveguide includes an oxide layer 502, a core 504, an electro-optic material layer 506, and metal electrodes 508. The electro-optic material is deposited on top of the core as a cladding layer. The index of the cladding can be changed, which would in turn change the effective index of the core. If this waveguide is used to form a micro-resonator, this change in index can be exploited as a tuning mechanism.

In another embodiment of the invention, a MEMs device is used to bring either an absorbing material or otherwise a non-absorbing material in close proximity or in contact with the micro-resonator device actuated by metal electrodes placed far away from the waveguide core. MEMs is an attractive technology because it is easy to understand and is relatively easy to implement in an integrated optics environment. These effects are localized and can be implemented in a high-density environment.

Figure 3B:
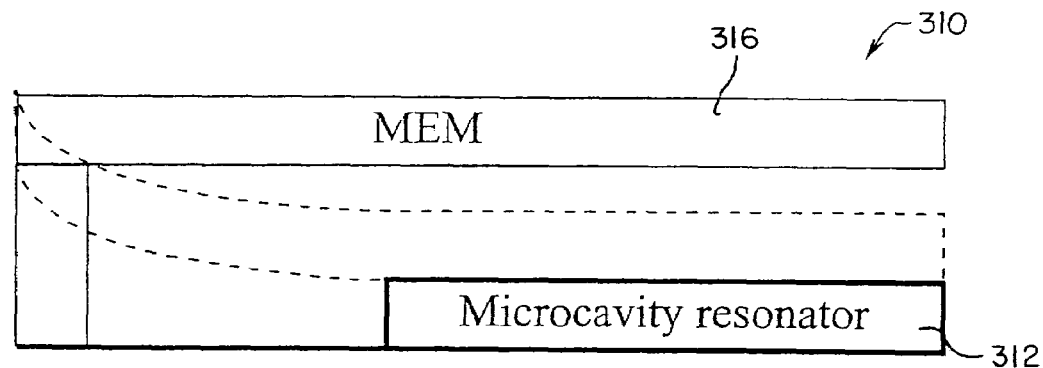
FIG. 3B is a schematic block diagram of a system using a MEMs device to change the resonance of a micro-resonator cavity.

FIG. 3B is a schematic block diagram of a system 310 in which a MEMs device 316 is used to change the resonance of a micro-resonator cavity 312. In general, a MEMs cantilever can be designed to deflect to and from a micro-cavity, affecting the core dielectric. The MEMs cantilever arm may be designed with a thin layer of high index material, which matches the core index, or it may be designed with a metal layer to enhance absorption.

In accordance with the invention, it has been shown by beam propagation simulation that a cladding index change of 1% leads to an effective index change of 0.2% for a waveguide with a core index of 2. A 0.2% change in the effective index gives rise to a line shift of 3 nm. For a Q=2000 resonator, this is a shift of 4 full widths.

Beam propagation simulation was used in a high index contrast (index difference between the core and cladding equal to or greater than 0.3) waveguide to prove the feasibility of using electro-optic effect in micro-resonator cavities. For lower index contrast waveguides the dependence of the effective and group indices to an index change in the cladding due to the electro-optic will be larger. A cladding index change of 1% leads to an effective index change of 0.2% for a waveguide with index contrast of 0.5. A 0.2% change in the effective index gives rise to a line shift of 3 nm. For a Q=2000 resonator, this is a shift of 4 full widths.

In an earlier described embodiment, the invention utilizes a small optical fiber to provide a small effective index change for a micro-resonator cavity mode. The resonance response of an air clad silicon micro-ring resonator was first measured. An optical fiber was then lowered gently onto the resonator cavity. The response was measured a second time after the fiber had been lowered and a third time after the fiber had been raised. There was hysteresis and broadening of the resonance line due to loss, which was probably due to dirt on the fiber. Nevertheless the line shift of over 1 nm indicates that this method is a viable tuning method. In fact the theoretical line-shift can be found to be estimating the effective indices of a silicon micro-resonator with and without a top silica cladding.

Assuming that the presence of the silicon converted the resonator from air clad to silica clad, the maximum effective index change was 0.8%, which corresponds to a line shift of 12 nm. The fact that the line shift was much smaller indicates that the fiber was not in intimate contact with the ring. However, this experiment shows that it is, in principle possible to shift the resonance of a micro-cavity using a mechanical device without destroying it.

The operation of such a device is simple. The cladding of the high index waveguide is designed so that its index can change. In general, any method of changing the index of the cladding may be used. Two examples of such methods are using an electro-optic cladding and using a MEMs device to change the index of the cladding. If tuning, modulating or switching of the micro-resonator is desired, the index of the cladding is tuned, modulated and switched.

A previously described exemplary embodiment of the invention uses a large mechanical method to change the local environment of the micro-cavity resonator. It is easy, therefore, to envisage a small micro-electro mechanical (MEMs) device, which can incorporate a dielectric material mounted on a small cantilever that can be deflected using electrical means, as shown in FIG. 5.

There are many ways to use a MEMs device to change the position or shape of the resonance. The first is the method used in the exemplary embodiment previously described, in which changing the effective and group indices of the cladding is done by using a dielectric mounted on a cantilever. A second method would be to induce loss by either contacting the resonator with a material with high loss like metal or a dielectric with an index that is close to the index of the resonator. Again, either of these materials may be mounted on a cantilever beam. The material with high loss would cause absorption in the micro-resonator cavity mode, while the dielectric with index close to that of the mode can be used to induce scattering which would in turn increase the loss of the cavity mode. In both these effects, the Q of the micro-resonator cavity will drop. Additionally, a non-absorbing material brought in close proximity to or in contact with the micro-resonator cavity, will change the effective and group indices of the mode, which would in turn result in a change of position of the resonance.

A third use of the MEMs tuning technique would be to preferentially change the effective and group indices of one polarization with respect to the other. This would help induce or eliminate polarization dependent operation of the micro-cavity. The exact implementation of a MEMs structure is well known to those of skill in the art.

The exemplary embodiment of the invention involves the fabrication of an electro-optic material (of lower index than the core) adjacent to the core of the waveguide micro-resonator cavity. Metal electrodes are fabricated in the vicinity of the resonator, close enough to apply a large electric field across the waveguide and far (greater than 1 devay length of the evanescent field) enough from the core for loss to be negligible. Switching action is obtained by applying a modest voltage across a short distance near the resonator, which would change the index of the cladding, and hence the effective and group indices of the mode in the resonator. This change of effective and group indices would in turn result in a change in the position of the resonance line. Since an electro-optic effect is used, this effect is very fast. The choice of electro-optic material is not critical to the operation, but is important for the fabrication of the device. For example, a non-linear crystal such as KDP or Lithium Niobate has the advantage of being well understood, but may be hard to integrate into an integrated optics system. On the other hand, electro-optic polymers are easy to fabricate, but are not well understood. Both methods would work, however.

B. Polarization control a. Polarization Control of an Integrated Optical Waveguide by Dynamically Changing the Symmetry of Integrated Optical Waveguide In an exemplary embodiment, the invention includes a method of controlling the polarization dependent properties of a high index difference integrated optical waveguide by changing symmetry of the waveguide in a dynamic manner. Polarization control of integrated optics waveguides is important, since the polarization of any input fiber could be random and the operation of any integrated system must take into account this randomness. Polarization control is especially important in high index difference waveguides because they are more sensitive to variations in fabrication.

One method to negate this randomness would be to control the polarization in the integrated optical circuit by using an integrated optical polarization controller.

Polarization control can be achieved in one of several ways: by changing the symmetry of cladding index around the core of the waveguide alters the cross-sectional symmetry of the waveguide, by changing the birefringence of the material of the cladding and/or the core of the waveguide changes the cross-sectional symmetry of the waveguide, by changing the absorption of cladding index around the core of a high index waveguide alters the polarization dependent loss of the waveguide, or by changing the index of the cladding of the waveguide brought about totally or in part by the thermo-optic effect.

In accordance with the invention, it has been shown that changing the effective index of refraction of the cladding asymmetrically by beam propagation simulation can change the effective index of one polarization with respect to the other. This, in turns enables the change of the polarization of the light going down the waveguide.

Any generalized method of changing the index symmetry of the waveguide may be used. In fact, if any of the previous described methods are applied asymmetrically to the waveguide, in a controlled manner, the polarization dependence of the resonance wavelength of the optical waveguide may be changed. As an example, FIGS. 6A–6D show how one might change the symmetry of the waveguide.

Figure 6C:
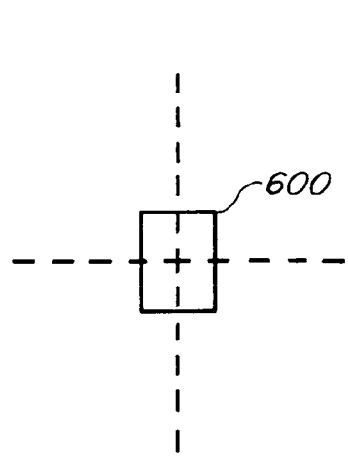
Figure 6D:
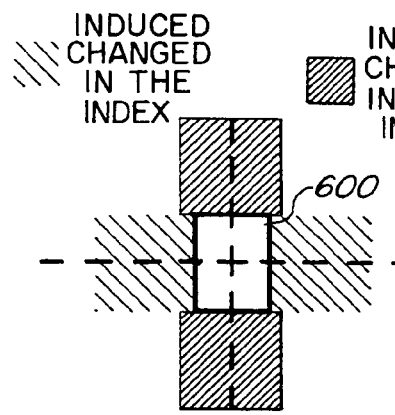

FIG. 6A shows a symmetric waveguide 600 with a degenerate TE and TM mode. The propagation constants are identical theoretically. To break the degeneracy, the index profile around the waveguide can be changed as in FIG. 6B. The symmetry around the waveguide is broken and the degeneracy is lifted, resulting in different effective indices for both TE and TM modes. On the other hand, if an asymmetric waveguide is made as in FIG. 6C or 6D, either due to fabrication tolerance or on purpose, it will have polarization dependent operation. This dependence can be compensated, if the asymmetry of the index profile is changed. These ideas can be easily extended to a micro-ring resonator waveguide to enhance or compensate polarization dependent operation.

The index profile of the waveguide is designed so that the index on one axis of symmetry can be changed substantially, while the index on the other axis of symmetry is hardly changed at all or is changed with opposite sign with respect to the profile in the other axis of symmetry. In this way, when a change in the polarization dependence is desired, the index profile of one axis of symmetry can be changed. For example, if it is desired to slow down the TE mode of the device, the effective index of the vertical axis is increased, and/or the effective index of the horizontal axis is decreased.

The methods used to change the symmetry of the core and/or the cladding of the waveguide include: the electro-optic effect, the acousto-optic effect, using a MEMs device, and the thermo-optic effect.

In accordance with one embodiment of the invention, a polarization control integrated optic waveguide device is fabricated by placing one or more tuning elements around the waveguide. These elements are then controlled to change either the cross-sectional symmetry of the index of the waveguide, the cross-sectional symmetry of the birefringence of the material comprising the waveguide, or the cross-sectional symmetry of the absorption of the material comprising the waveguide. In this embodiment, electrodes may be used to activate the tuning elements. Furthermore, it is desirable to place these electrodes at a distance larger than decay length of the optical intensity in the cladding.

One possible extension of this technique is to implement an integrated optic polarization controller. In general, a small amount of power is tapped from the optical signal and is put through a polarizer and detected. This polarizer could be a single polarization waveguide. The detected signal is then used to actuate a tuning passive device, which can change the index profile of the waveguide asymmetrically that can in turn change the polarization of the light in the waveguide. If the device is in a packet switched environment, the speed of the adjustments need to be on the order of nanoseconds, so a fast effect like the electro-optic effect is needed.

b. Changing the Cavity's Polarization Dependent Resonance Position by Changing the Symmetry of the Index Profile of the Micro-Resonator Cavity If the method previously described is applied to micro-resonators, the polarization dependence of a micro-resonator can be changed. The invention is useful especially for fixing any birefringence in the micro-cavity resonator. As described previously, the invention has been shown by beam propagation simulation that changing the index of refraction of the cladding asymmetrically can change the difference in the index of both polarizations.

A generalized method of changing the index symmetry of the waveguide may be used. The index profile of the resonator waveguide is designed so that the index on one axis of symmetry can be changed substantially, while the index on the other axis of symmetry is hardly changed at all or is changed with opposite sign with respect to the profile in the other axis of symmetry. In this way, when a change in the polarization dependence is desired, the index profile of one axis of symmetry can be changed. For example, if it is desired to slow down the TE mode of the resonator, the effective index of the vertical axis is increased, and/or the effective index of the horizontal axis is decreased. In this way, both the TE and TM modes in a micro-cavity can be tuned in situ to give the same resonance positions, thus eliminating or enhancing the polarization dependence.

In accordance to an exemplary embodiment of the invention, the polarization dependence of an integrated optic waveguide micro-resonator is controlled by placing one or more tuning elements around the waveguide micro-resonator. These elements are then controlled to change either the cross-sectional symmetry of the index of the waveguide, the cross-sectional symmetry of the birefringence of the material comprising the waveguide, or the cross-sectional symmetry of the absorption of the material comprising the waveguide. In this embodiment, electrodes may be used to activate the tuning elements. Furthermore, it is desirable to place these electrodes at a distance larger than decay length of the optical intensity in the cladding.

C. Stress tuning

Figure 7:
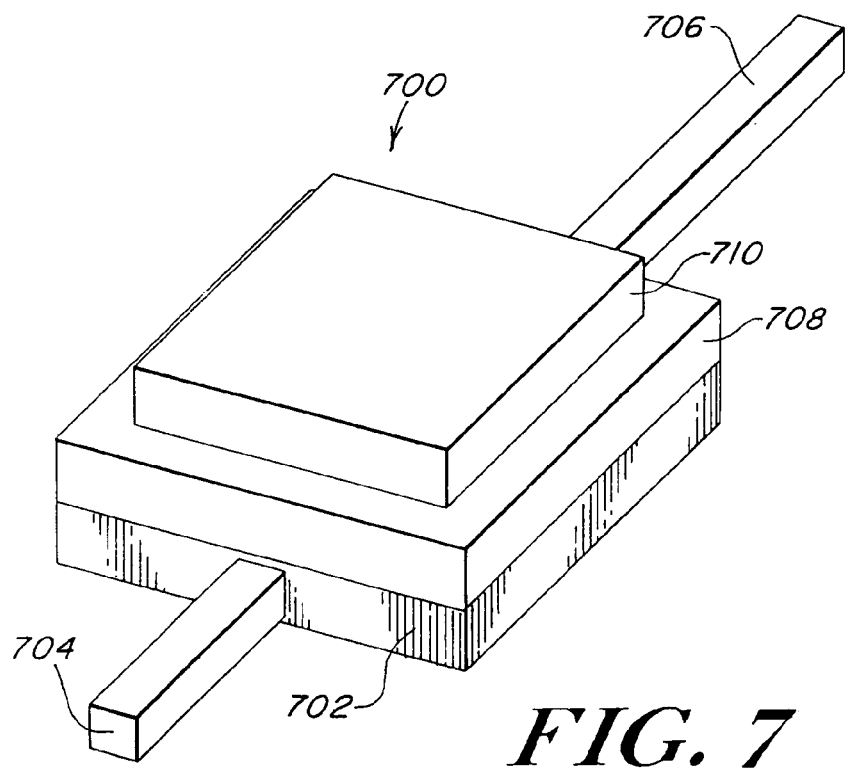
FIG. 7 is a schematic block diagram of a device 700 that tunes a micro-resonator by stress.

FIG. 7 is a schematic block diagram of a device 700 that tunes a micro-resonator by stress. A micro-resonator 702 is connected to an input waveguide 704 and an output waveguide 706. A stress element 710 supplies a local stress field to micro-resonator. The stress element and the micro-resonator are separated by a separation layer 708. The function of the separation layer is to spatially separate the stress element and the micro-resonator, and to transmit the stress field. By altering the amount of stress that the stress element provides to the micro-resonator, the refractive index of the micro-resonator is changed. This change in the refractive index induces a change in the resonance condition of the micro-resonator, shifting its resonance wavelengths.

To achieve integrated, local control of the stress, the stress element is first deposited on-chip as a thin film, via various deposition techniques such as sputtering, electro-plating, chemical deposition, physical depositions, and etc. This deposition step might require additional processing steps for enhancing the integrity of the deposited film. The stress element is then patterned to localize the stress so that only the micro-resonator underneath is affected. This process design allows for integrated, local resonance tuning of each micro-resonator when multiple micro-resonators are incorporated on-chip. There will be additional processing steps to establish connections to the stress element, in order to control the stress that it exerts to the underlying layer.

The existence of the separation layer helps spatially separate the micro-resonator from the stress element so that the stress element does not disrupt the optical mode in the micro-resonator. The thickness of the separation layer should be chosen to avoid such disruption. With the presence of the separation layer, only the stress field from the stress element is delivered and nothing else. The separation layer has to be transparent to the wavelengths that the micro-resonator operates in, since it acts as a cladding to the micro-resonator 702.

The resonance tuning can either be permanent or temporary depending on the recovery of the strain induced by the stress. When there is a mechanism for the micro-resonators to reverse its strain after the stress is removed, the tuning is temporary. When there isn't such a mechanism, the tuning is permanent.

Figure 8:
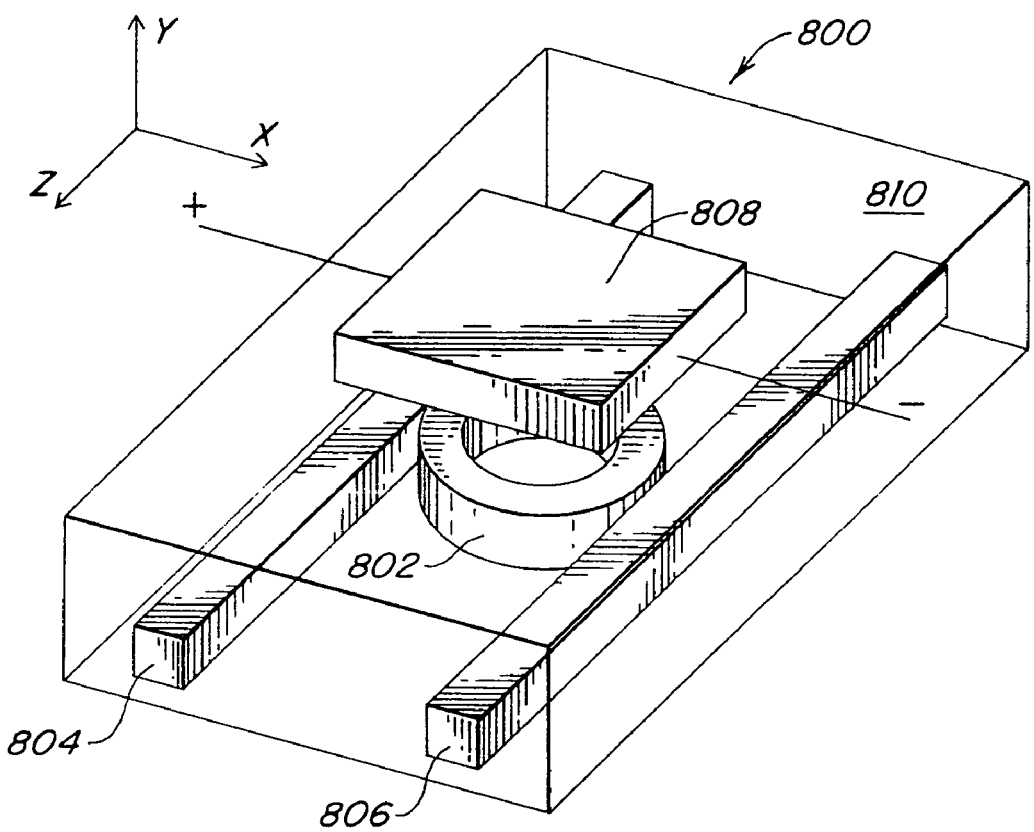
FIG. 8 is a schematic block diagram of an exemplary embodiment of the invention utilizing a piezo-electric element as a stress element.

FIG. 8 is a schematic block diagram of another exemplary embodiment of a device 800 that tunes resonance of a micro-resonator by applying stress. A micro-ring resonator 802 has a resonance characteristic according to its dimension. Input 804 and output 806 waveguides carry light in and out of the micro-ring. A piezo-electric element 808 functions as a stress element. The element 808 is connected to electrical connections for turning on/off. A cladding layer 810 surrounds the micro-ring and spatially separates the micro-ring from the element 808. The cladding layer is transparent to the resonant wavelengths and has refractive index lower than that of the micro-ring and the waveguides.

When a voltage is applied to the element 808, the element supplies stress to the underlying cladding layer. The cladding layer delivers the stress to the micro-ring and causes a change in its refractive index. This change causes a change in the resonance condition of the micro-ring, and thus shifts the resonance wavelengths that are coupled to the output waveguide. Thus, resonance tuning of a micro-resonator is achieved.

Figure 9:
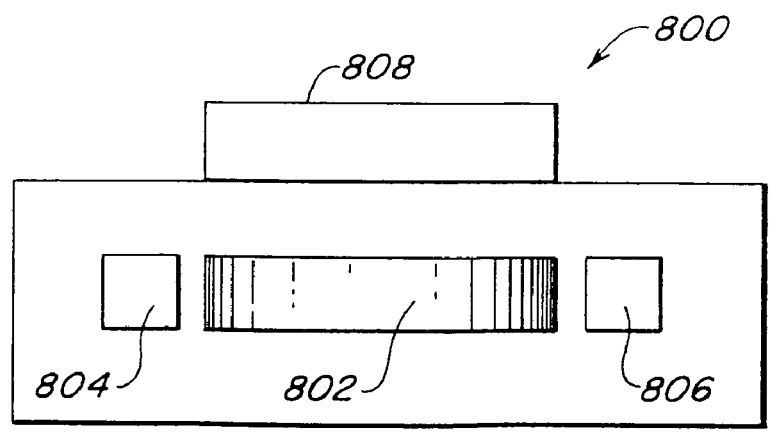
FIG. 9 is a cross-section view in the X-Y plane of the embodiment shown in FIG. 8.

A cross-section of the device 800 of FIG. 8 in X-Y plane is shown in FIG. 9. The input and output waveguides are physically separated from the micro-ring. However, the light from and to the waveguide is transferred to the micro-ring through evanescent coupling.

The voltage range that the embodiment in FIG. 8 operates in should be chosen properly to obtain the desired tuning range. This voltage range does not have to start from 0V. Other types of micro-resonators can be used in this embodiment, such as micro-photonic band gap (PBG) and micro-disks, micro-spheres, diffractive grating, and etc. Other types of stress elements such as Micro-Electro-Mechanical Subsystems (MEMS), electrostatic elements, and etc can be used in this embodiment.

Although the present invention has been shown and described with respect to several preferred embodiments thereof, various changes, omissions and additions to the form and detail thereof, may be made therein, without departing from the spirit and scope of the invention.

What is claimed is:

1. A high index difference waveguide micro-resonator device that temporarily changes position or shape of resonance comprising:
   at least one patterned layer core, the at least one patterned layer core has at least one resonator and at least one input/output waveguide;
   a cladding surrounding said core, said cladding including regions surrounding said core where an evanescent field resides unless temporarily changed;

non-intersecting input and output waveguides;
at least one layer defining a tuning region; and
at least one electrode in poor electrical contact with said core, wherein
said position or shape of resonance is temporarily changed by applying a current or voltage to said at least one electrode so as to induce a change in index of refraction in said tuning region.

2. The device of claim 1, wherein the tuning region is used to change the index of at least part of the cladding by a thermo-optic effect.

3. The device of claim 1, wherein the tuning region comprises a material whose index is changed through an electro-optic effect.

4. The device of claim 1, wherein the tuning region comprises a material whose index is changed through an acousto-optic effect.

5. The device of claim 1, wherein the tuning region comprises a material whose index is changed through a magneto-optic effect.

6. The device of claim 1, wherein the tuning region comprises a material whose index is changed through a photo-refractive effect.

7. The device of claim 1, wherein the tuning region comprises a material that is able to move mechanically.

8. The device of claim 1, wherein means for generating a change in the cladding of the micro-resonator are monolithically integrated with said input and output waveguides.

9. The device of claim 1, wherein means for generating a change in the cladding of the micro-resonator are hybridly integrated with said input and output waveguides.

10. The device of claim 1, wherein means for generating a change in the cladding of the micro-resonator are fabricated in the vicinity of said input and output waveguides.

11. The device of claim 1, wherein means for generating a change in the cladding of the micro-resonator are placed in contact with a substrate on which the micro-resonator is configured.

12. The device of claim 1, wherein said at least one electrode stands off at a distance larger than decay length of the optical intensity in the cladding.

13. The device of claim 1, wherein change of said cladding results in a change in optical path length in said micro-resonator.

14. The device of claim 1, wherein change of said cladding results in a change in coupling of said micro-resonator, thus a change in coupling efficiency and shape of the micro-resonator resonance.

* * * * *